United States Patent
Pribble et al.

(10) Patent No.: US 12,380,593 B2
(45) Date of Patent: Aug. 5, 2025

(54) AUTOMATIC IMAGE CROPPING USING A REFERENCE FEATURE

(71) Applicant: Capital One Services, LLC, McLean, VA (US)

(72) Inventors: Jason Pribble, McLean, VA (US); Swapnil Patil, Chantilly, VA (US); Alexandria McDonald, Wausau, WI (US)

(73) Assignee: Capital One Services, LLC, McLean, VA (US)

( * ) Notice: Subject to any disclaimer, the term of this patent is extended or adjusted under 35 U.S.C. 154(b) by 354 days.

(21) Appl. No.: 18/053,576

(22) Filed: Nov. 8, 2022

(65) Prior Publication Data

US 2024/0153126 A1 May 9, 2024

(51) Int. Cl.
*G06T 7/70* (2017.01)
*G06T 7/13* (2017.01)
(Continued)

(52) U.S. Cl.
CPC .......... *G06T 7/70* (2017.01); *G06T 7/13* (2017.01); *G06T 7/62* (2017.01); *G06V 10/242* (2022.01);
(Continued)

(58) Field of Classification Search
CPC ...... G06V 30/40; G06V 20/62; G06V 10/757; G06V 20/698; G06V 30/153; G06V 30/412; G06V 30/416; G06V 30/224; G06V 30/413; G06V 30/418; G06V 10/242; G06V 10/25; G06V 10/267; G06V 10/761; G06V 40/161; G06V 10/247; G06T 2207/30176; G06T 11/60; G06T 7/11; G06T 7/70; G06T 7/13; G06T 7/62; G06T 2207/20132; G06T 3/00; G06T 7/12
See application file for complete search history.

(56) References Cited

U.S. PATENT DOCUMENTS

2017/0357869 A1* 12/2017 Shustorovich ..... G06V 30/2253
2018/0373679 A1* 12/2018 Ranjan ................ G06F 40/103
2020/0394422 A1* 12/2020 Bu ......................... G06V 10/50

FOREIGN PATENT DOCUMENTS

WO   WO-2021212873 A1 * 10/2021 ....... G06F 18/23213

OTHER PUBLICATIONS

English Translation: WO-2021212873-A1 (Year: 2021).*

* cited by examiner

*Primary Examiner* — Sumati Lefkowitz
*Assistant Examiner* — Aaron Joseph Sorrin
(74) *Attorney, Agent, or Firm* — Harrity & Harrity, LLP (57) ABSTRACT

In some implementations, a device may receive the image of the document, the image of the document depicting the reference feature, and the reference feature being associated with one or more location parameters for a document type associated with the document. The device may detect a location of the reference feature as depicted in the image, the location being defined by bounds of the reference feature as depicted in the image. The device may detect a border of the document as depicted in the image based on identifying one or more edges of the document based on the bounds of the reference feature and the one or more location parameters. The device may modify the image of the document based on the border of the document to obtain a cropped image. The device may transmit, to a server device, the cropped image.

20 Claims, 7 Drawing Sheets

(51) Int. Cl.
*G06T 7/62* (2017.01)
*G06V 10/24* (2022.01)
*G06V 10/25* (2022.01)
*G06V 10/26* (2022.01)
*G06V 10/74* (2022.01)

(52) U.S. Cl.
CPC ............ *G06V 10/25* (2022.01); *G06V 10/267* (2022.01); *G06V 10/761* (2022.01); *G06T 2207/20132* (2013.01); *G06T 2207/30176* (2013.01)

AUTOMATIC IMAGE CROPPING USING A REFERENCE FEATURE

BACKGROUND

Image analysis or imagery analysis is the extraction of meaningful information from images, such as from digital images by means of image processing techniques. For example, object detection is a technology related to computer vision and image processing that is associated with detecting instances of semantic objects of a certain class (such as humans, buildings, or cars) in digital images and/or videos. Object detection algorithms typically leverage machine learning or deep learning to produce meaningful results indicating objects detected in digital images and/or videos. For example, a machine learning model (such as a convolutional neural network) may be trained to automatically detect objects within images and/or videos. The machine learning model may be trained to insert an indication (e.g., a bounding box) around a detected object in an image that is input to the machine learning model.

SUMMARY

Some implementations described herein relate to a system for automatic image cropping using a reference feature. The system may include one or more memories and one or more processors communicatively coupled to the one or more memories. The one or more processors may be configured to obtain an image of a document, the image of the document depicting the reference feature, and the reference feature being associated with a defined location, size, and orientation for a document type associated with the document. The one or more processors may be configured to obtain, via an output of an object detection model, an indication of a location of the reference feature as depicted in the image, the indication of the location including a bounding box. The one or more processors may be configured to detect an outline of the document as depicted in the image based on identifying one or more edges of the document by expanding the bounding box based on the defined location, size, and orientation of the reference feature. The one or more processors may be configured to crop the image of the document based on the outline of the document to obtain a cropped image. The one or more processors may be configured to provide, to a server device, the cropped image.

Some implementations described herein relate to a method of automatically cropping an image of a document using a reference feature. The method may include receiving, by a device, the image of the document, the image of the document depicting the reference feature, and the reference feature being associated with one or more location parameters for a document type associated with the document. The method may include detecting, by the device, a location of the reference feature as depicted in the image, the location being defined by bounds of the reference feature as depicted in the image. The method may include detecting, by the device, a border of the document as depicted in the image based on identifying one or more edges of the document based on the bounds of the reference feature and the one or more location parameters. The method may include modifying, by the device, the image of the document based on the border of the document to obtain a cropped image. The method may include transmitting, by the device and to a server device, the cropped image.

Some implementations described herein relate to a non-transitory computer-readable medium that stores a set of instructions for a device. The set of instructions, when executed by one or more processors of the device, may cause the device to obtain an image of a document, the image of the document depicting a reference feature, and the reference feature being associated with one or more location parameters for a document type associated with the document. The set of instructions, when executed by one or more processors of the device, may cause the device to obtain, via an output of an object detection model, an indication of a location of the reference feature as depicted in the image, the indication of the location including a bounding box. The set of instructions, when executed by one or more processors of the device, may cause the device to detect a border of the document as depicted in the image based on identifying one or more edges of the document by expanding the bounding box based on the one or more location parameters. The set of instructions, when executed by one or more processors of the device, may cause the device to crop the image of the document based on the border of the document to obtain a cropped image. The set of instructions, when executed by one or more processors of the device, may cause the device to provide, to a server device, the cropped image.

DETAILED DESCRIPTION

The following detailed description of example implementations refers to the accompanying drawings. The same reference numbers in different drawings may identify the same or similar elements.

In some examples, a device may use one or more image analysis techniques to analyze an image of a document. For example, the device may use the one or more image analysis techniques to detect an outline or a border of a document as depicted in an image (e.g., using a document detection technique). For example, document detection may include the device detecting the corners and edges of the document as depicted in the image. In some cases, a neural network or other machine learning model may be trained (e.g., using training images that include images of documents with labeled corners and/or edges) to detect the corners and edges of documents in images. As another example, a machine learning model may be trained to detect rectangles in images (e.g., because documents are generally rectangular in shape).

Current document detection techniques rely on the device detecting the corners and/or edges of the document. For example, current document detection techniques may use a contour-based approach to detect significant local changes in an image (e.g., which indicate an edge). For example, the device may detect an edge of a document by detecting a local change in an image intensity (e.g., associated with a discontinuity in the image intensity, such as where the image intensity discontinues or abruptly changes) to detect edges of a document depicted in an image.

However, in some cases, contour-based edge detection may be insufficient for detecting the edges of a document in an image. For example, the document may be associated with a page in a book or a booklet (e.g., a page in a passport booklet). In such examples, an edge between two pages of the book or booklet may be associated with a change in contour or image intensity between the two pages that is insufficient for the device to detect the edge of the page. As another example, a difference in image intensity and/or contour between an edge of a document and a background of the image may be insufficient for the device to detect the edge of the document.

As a result, the device may be unable to detect the outline or border (e.g., the edges) of a document depicted in an image. Therefore, the device may capture and/or obtain another image of the document to attempt to detect the document, thereby consuming processing resources, computing resources, and/or memory resources associated with obtaining an additional image and processing or analyzing the additional image. In some cases, the device may detect the document as part of an operation associated with the document (e.g., the device may detect the document to enable the device is isolate the document and transmit an image of the isolated document to another device). In such examples, the failure or inaccuracy of the document detection may result in the device transmitting an image that depicts more than just the document. This may consume network resources, processing resources, computing resources, and/or memory resources, among other examples, associated with transmitting an image having a larger size (e.g., the image that depicts more than just the document may have a larger size than an image of only the isolated document). Further, this may result in additional processing at the other device associated with analyzing an image that depicts more than just the document (e.g., the other device may perform additional processing to identify and/or detect the document).

Some techniques and implementations described herein enable automatic image cropping using a reference feature. For example, an image processing device may obtain an image of a document. The image of the document may depict a reference feature that is included in the document. The reference feature may be associated with one or more location parameters for a document type associated with the document. For example, the one or more location parameters may indicate a defined location, size, and/or orientation for the reference feature as included in documents associated with the document type. The image processing device may detect a location of the reference feature as depicted in the image, the location being defined by bounds of the reference feature as depicted in the image. For example, the image processing device may obtain, via an output of an object detection model, the indication of the location of the reference feature as depicted in the image. In some implementations, the indication of the location may include a bounding box that is inserted into the image around the reference feature.

The image processing device may detect an outline or border of the document as depicted in the image based on identifying one or more edges of the document by expanding the bounding box based on the one or more location parameters (e.g., based on the defined location, size, and/or orientation) of the reference feature. For example, the one or more location parameters may indicate one or more percentage values indicating distances between one or more edges of the reference feature and the one or more edges of the document. The image processing device may calculate one or more distances between the bounds of the reference feature and the one or more edges of the document based on multiplying the one or more percentage values by a size of the reference feature. As another example, the image processing device may project one or more edges of the bounding box based on the pattern and a size and an orientation of the image to detect one or more edges of the document that define the border or outline of the document as depicted in the image.

The image processing device may modify (e.g., crop) the image of the document based on the border of the document to obtain a cropped image. For example, the image processing device may modify a size of the image based on the detected border or outline of the document. In some implementations, the image processing device may transmit or provide the cropped image to a server device.

As a result, the image processing device may be enabled to detect the borders or edges of a document using the detected reference feature depicted in an image of the document. This enables the image processing device to perform document detection without relying on contour-based edge detection associated with images of the document. Therefore, the image processing device is enabled to detect an outline or border of a document depicted in an image where the document is a page in a book or booklet and/or where the background of the image is a similar color or image intensity as the document, among other examples. This may conserve processing resources, computing resources, network resources, and/or memory resources, among other examples, that would have otherwise been used associated with obtaining additional images of the document to be detected, attempting to crop the image of the document using inaccurate edge detections, and/or transmitting an image of the document that is not properly cropped and/or detected, among other examples.

FIGS. 1A-1D are diagrams of an example 100 associated with automatic image cropping using a reference feature. As shown in FIGS. 1A-1D, example 100 includes an image processing device, a user device, and a server device. These devices are described in more detail in connection with FIGS. 2 and 3.

Figure 1A:
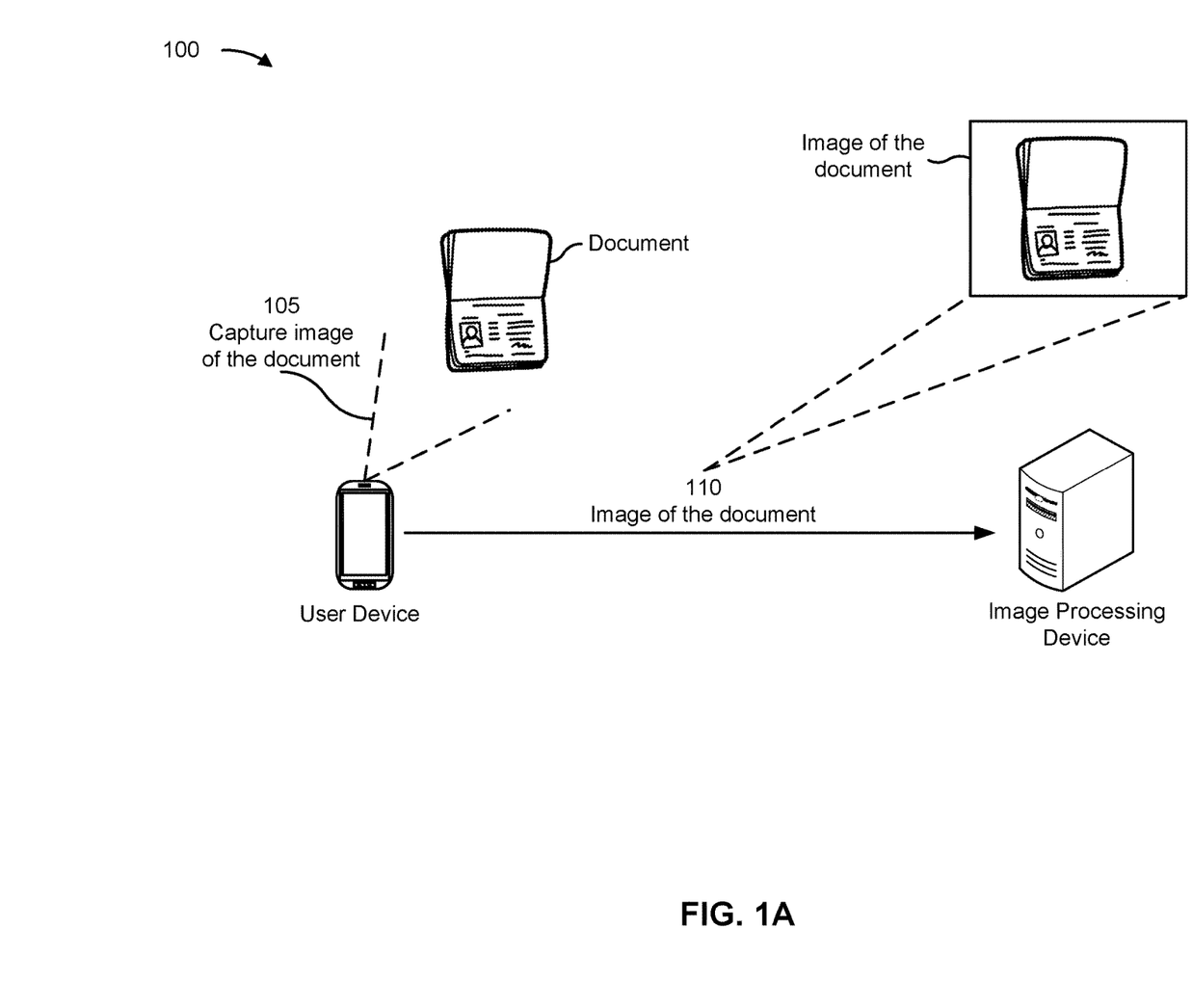
FIGS. 1A-1D are diagrams of an example associated with automatic image cropping using a reference feature, in accordance with some embodiments of the present disclosure.

In some implementations, the image processing device may be associated with the user device. For example, the image processing device and the user device may be the same device (e.g., a single device). As another example, the image processing device may be a component of the user device. In other implementations, the image processing device may be a separate device from the user device. In some implementations, the image processing device may be associated with an application executing on the user device and/or a web page visited by the user device. For example, the image processing device may be associated with an application and/or a web page that is associated with obtaining and/or processing images of documents, as described in more detail elsewhere herein.

As shown in FIG. 1A, and by reference number 105, the user device may capture an image of a document. For example, a camera or similar device associated with the user device may capture the image of the document. For example, a user may provide an input to the user device to capture the image of the document. In other examples, the image of the document may be downloaded by the user device and/or retrieved from a memory of the user device.

In some implementations, the image processing device may transmit, and the user device may receive, a request for the image of the document. For example, the image processing device may provide instructions to cause a request for the image of the document to be displayed by the user device. The user device may capture the image of the document in response to the request for the image of the document from the image processing device. For example, the image processing device may request the image of the document as part of an authentication procedure. The authentication procedure may be associated with authenticating the document and/or with authenticating an account (e.g., where providing an authenticated document is one authentication factor used to authenticate the account), among other examples. As another example, the image processing device may request the image of the document as part of an analysis of the document (e.g., to process the image of the document and/or to obtain information included in the document).

As shown by reference number 110, the image processing device may obtain the image of the document. For example, the user device may transmit, and the image processing device may receive, an indication of the image of the document. In some implementations, the user device may provide the image of the document from a memory of the user device. For example, the user device may upload the image of the document to the image processing device.

In some implementations, the document may be associated with a document type. The document type may indicate a type, category, and/or classification of the document. A standardized document, such as one issued by a governmental entity or organization, in a common format may define a document type. For example, the document type may include an identification document, a passport, a driver's license, a bank check (e.g., a personal check, a certified check, and/or a cashier's check), a contract, a birth certificate, and/or a social security card, among other examples. For example, a document type may be any type of document that is associated with a template form (e.g., a common template or similar template across all documents associated with the document type). For example, a document type may be associated with a template that defines one or more locations of features (e.g., referred to herein as "reference features") depicted in documents.

In some implementations, a reference feature may be a field or element of a document that is located in the same, or similar, location in all documents associated with the document type. For example, a reference feature may be text, a graphical element, or a combination of the two that has one or more standardized locations for a particular type or format of document. A reference feature for a document type may be associated with one or more location parameters. The one or more location parameters may define a location, a size, and/or an orientation, among other examples, of the reference feature as depicted in documents associated with the document type. The known and/or expected location, size, and/or orientation of a reference feature included in a document may enable the image processing device to extrapolate the outline and/or border of the document based on detecting the location of the reference feature, as described in more detail elsewhere herein. Examples of reference features may include a machine-readable zone (e.g., associated with a passport), a text field (e.g., a name field associated with indicating a name of a person associated with the document, an expiration date field, an issued date field, a header field, a title field, or another text field), a user image (e.g., depicting an image of a person associated with the document), a page number, a document identifier field, and/or a barcode, among other examples. For example, information and/or content associated with a reference feature may vary from document to document associated with a given document type, but a location of the reference feature may be the same, or similar, for all documents associated with the document type.

Figure 1B:
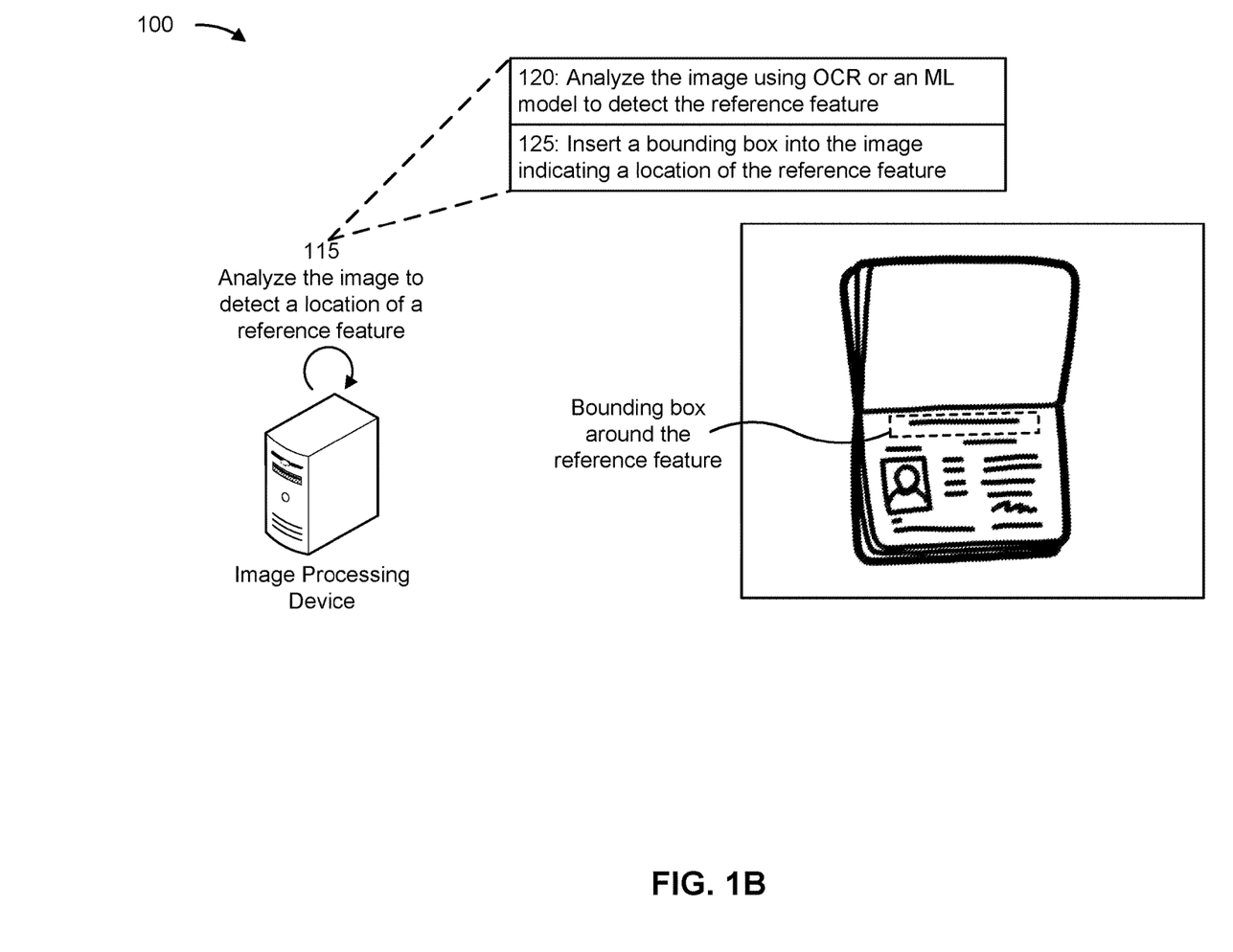

As shown in FIG. 1B, and by reference number 115, the image processing device may analyze the image of the document to detect a location of a reference feature depicted in the image of the document. In some implementations, the image processing device may detect and/or determine a document type associated with the image. For example, the image processing device may receive, from the user device, an indication of the document type associated with the image of the document. As another example, the image processing device may process and/or analyze the image of the document to detect the document type. The image processing device may determine the reference feature to be detected based on determining the document type associated with the image. For example, the image processing device may associate the document type with one or more reference features to be used to detect a border and/or outline of the document, as described in more detail elsewhere herein.

In some implementations, the image processing device may input, to an object detection model (e.g., a machine learning model trained to detect the reference feature), the image of the document. The image processing device may obtain, via an output of an object detection model, an indication of the location of the reference feature as depicted in the image. For example, as shown by reference number 120, the image processing device may analyze the image using optical character recognition (OCR) and/or the machine learning (ML) model to detect the reference feature as depicted in the image. For example, the object detection model may be trained using historical images of documents associated with the document type. The historical images may include indications of reference features depicted in the historical images. As another example, the image processing device may use an OCR technique to detect a text field associated with a reference feature. For example, the image processing device may obtain an indication of text depicted in the image of the document using the OCR technique. The image processing device may analyze the text to detect a text field associated with a reference feature. For example, the image processing device may analyze, using OCR, the image to detect bounds of the reference feature as depicted in the image of the document.

In some implementations, the image processing device may perform one or more pre-processing operations prior to detecting the location of the reference feature. For example, images of documents may be captured from different angles, orientations, and/or positions. This may introduce perspective distortion into the images of the document. For example, perspective distortion may be a warping or transformation of an image of an object and a surrounding area that differs from what the object would look like with a normal focal length (e.g., a focal length that reproduces a field of view that would appear "natural" to a human observer). In some implementations, the image processing device may perform perspective correction for the image based on the bounds of the reference feature as detected in the image.

For example, the image processing device may modify the image to a top-down view of the image. The top-down view may refer to a point of view from a location that is perpendicular to a plane of the document (e.g., and aligned with the center of the document). In some implementations, the image processing device may process image to transform a perspective of the image to the uniform view (e.g., to a top-down view). In some implementations, the image processing device may process the modified image frames to transform the image from an angled perspective view to a top-down view. For example, for a given image, the image processing device may obtain a set of transform reference points. The image processing device may transform the given image using the set of transform reference points. In other words, the image processing device may perform a perspective transformation on the image to transform the image to the uniform view. This may ensure that views of images captured by different cameras will be processed by the image processing device using the same view (e.g., the uniform view). This reduces complexity and/or improves an accuracy of reference feature location detections for images associated with different perspectives and/or configurations. In some implementations, the transformation performed by the image processing device may include a four-point perspective transform and/or a homography transformation. For example, the set of transform reference points may define the uniform view (e.g., a top-down view). The image processing device may utilize a transformation matrix, the set of transform reference points, and a size of the image to transform the image frame to the uniform view. In some implementations, the image processing device may detect the location of the reference feature using the top-down view of the image (e.g., the uniform view of the image).

In some implementations, the one or more pre-processing operations may include orientation correction (e.g., to modify an orientation or rotation of the image). For example, the image processing device may process the image of the document to modify an orientation or a rotation of the image of the document to obtain an oriented image. The image processing device may provide the oriented image as an input to the object detection model (e.g., where the output of the object detection model is based on the oriented image) to improve an accuracy of the detection of the reference feature. As another example, the one or more pre-processing operations may include modifying a brightness of the image (e.g., to improve a contrast and/or clarity of the image). As another example, the one or more pre-processing operations may include determining and/or detecting a perspective distortion associated with the image. For example, the image processing device may determine an angle and/or orientation at which the image was captured.

In some implementations, as shown by reference number 125, the image processing device may insert an indication of the detected location of the reference feature as depicted in the image. For example, the indication of the detected location may include a bounding box. The bounding box may be a minimum-perimeter bounding box or a minimum bounding box (e.g., a smallest box in which all points of the detected reference feature are included). In some implementations, the image processing device may not actually insert the bounding box into the image, but may rather store an indication of the location of the bounding box (e.g., may store coordinate location(s) of the bounding box). In other implementations, a machine learning model (e.g., the object detection model) may output the image with the bounding box inserted into the image. In some implementations, the image processing device may insert the bounding box defining the bounds of the reference feature, as detected using the top-down view, into the image of the document.

In some implementations, the image processing device may determine and/or confirm an accuracy of the detected location of the reference feature (e.g., of the location of the bounding box). For example, the image processing device may detect a second location of a second reference feature depicted in the image of the document. For example, the second reference feature may be a user image (e.g., depicting a face of a person). The image processing device may use a facial recognition model (e.g., a machine learning model trained to detect faces in images) to detect a location of the user image. The image processing device may compare the second location to the location (e.g., a first location) of the reference feature detected as described above. The image processing device may determine whether the first location is correctly detected based on comparing the second location to the first location. For example, the document type associated with the document depicted in the image may be associated with a correlation between reference features. For example, because each reference feature for the document type may be associated with a known and/or expected location, the image processing device may obtain a correlation between the locations of two reference features. For example, a side of a first reference feature and a side of a second reference feature may be expected to be parallel or perpendicular. As another example, a side of a first reference feature and a side of a second reference feature may be expected to be a certain distance apart. The image processing device may use the expected correlation between two reference features to determine whether one of (or both) the reference features has been correctly detected.

For example, the image processing device may detect that the reference feature as depicted in the image is obfuscated based on comparing the bounding box to the defined location, size, and orientation associated with the reference feature. For example, the image processing device may detect that the reference feature as depicted in the image is obfuscated based on comparing the bounding box to another location of another reference feature included in the image of the document. The image processing device may perform, based on detecting that the reference feature as depicted in the image is obfuscated, an action to modify the bounding box to a modified bounding box. For example, the image processing device may modify the bounding box based on determining that the first location is not correctly detected. In some implementations, the bounding box may be modified based on the first location and a correlation between the first location (e.g., of the bounding box) and the defined location (e.g., the known or expected location of the reference feature). For example, if a side of the reference feature is expected to be parallel or perpendicular to a side of another reference feature included in the document and the image processing device determines that a side of the bounding box is not aligned with a side of the other reference feature, then the image processing device may modify the side of the bounding box to be aligned with the side of the other reference feature. The image processing device may detect the outline of the document using the modified bounding box. This may improve an accuracy of the document border or outline detection, as described in more detail elsewhere herein.

In some implementations, if the image processing device determines that the location of the reference feature (e.g., the location of the bounding box) is not correct, then the image processing device may refrain from using the bounding box for document border or outline detection, as described in more detail elsewhere herein. This may conserve processing resources, computing resources, and/or memory resources, among other examples, that would have otherwise been used to detect the outline of the document using a bounding box that inaccurately indicates a location of the reference feature.

In some implementations, the image processing device may modify a perspective orientation of the bounding box. For example, the object detection model may insert a bounding box that is rectangular in shape. However, based on the perspective at which the image is captured, the image processing device may modify a shape of the bounding box to correlate to the perspective orientation of the image. For example, the image processing device may detect a perspective orientation associated with the image. The image processing device may modify the bounds of the reference feature as depicted in the image based on the perspective orientation. In other words, the image processing device may modify the shape of the bounding box (e.g., from rectangular to another quadrilateral shape). For example, the shape of the bounding box may be a rectangle only if viewed from a top-down view. The image processing device may modify the shape of the bounding box such that the shape of the bounding box corresponds to the angle at which the image is captured (e.g., such that the shape is what would be perceived by a person from the angle). In other words, the image processing device may perform perspective correction for the image based on the bounds of the reference feature as detected in the image. This may improve an accuracy of the document border or outline detection, as described in more detail elsewhere herein.

Figure 1C:
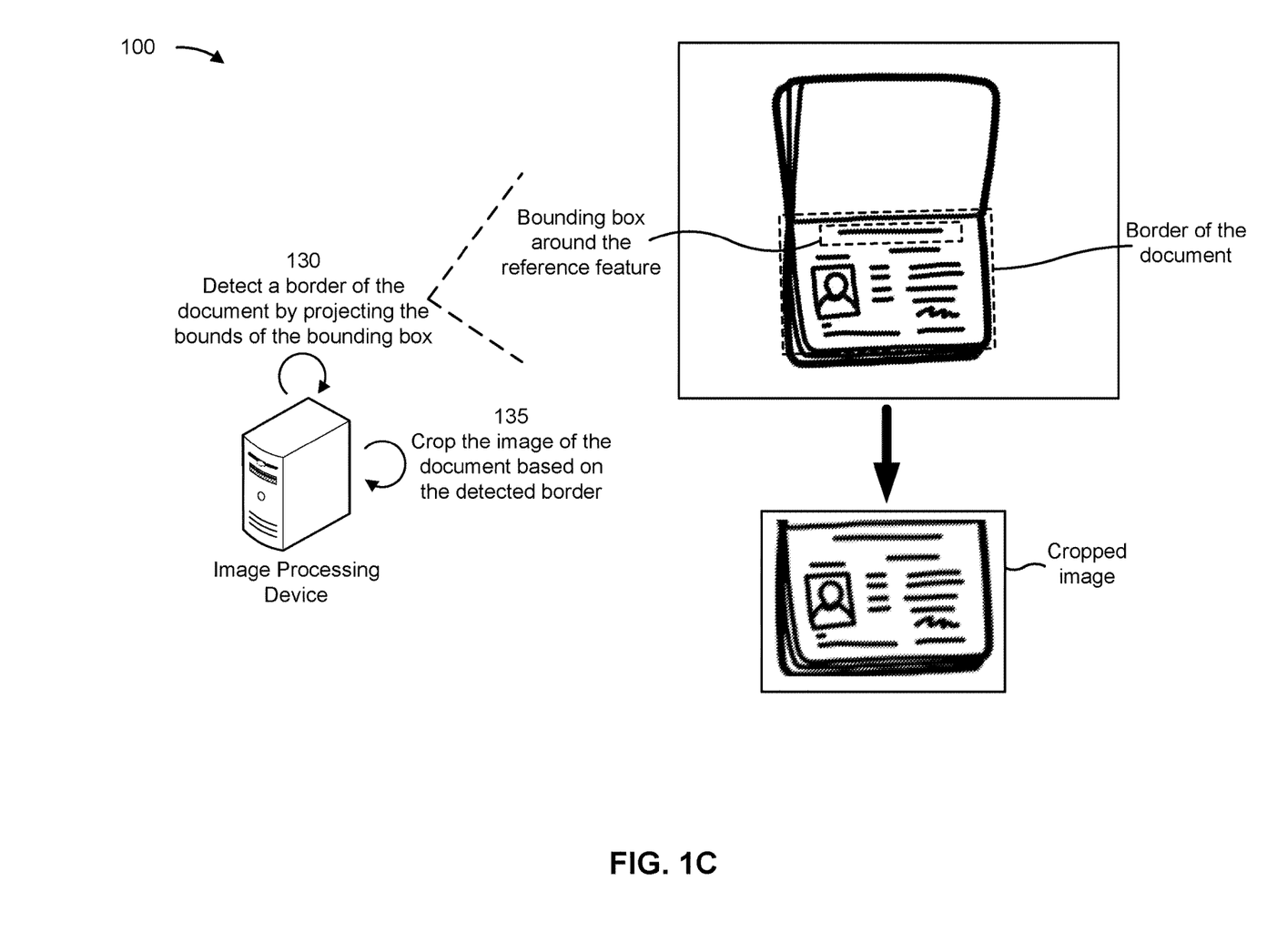

As shown in FIG. 1C, and by reference number 130, the image processing device may detect a border or an outline of the document as depicted in the image based on the bounds of the bounding box. The image processing device may detect the border or outline of the document as depicted in the image based on identifying one or more edges of the document based on the bounds of the reference feature and the one or more location parameters associated with the reference feature. For example, the image processing device may detect the outline or border of the document as depicted in the image based on identifying one or more edges of the document by expanding the bounding box based on the defined location, size, and orientation of the reference feature.

For example, the one or more location parameters may indicate one or more percentage values indicating distances between one or more edges of the reference feature and the one or more edges of the document. For example, a percentage value may indicate a distance between the reference feature and an edge of the document. For example, a percentage value may indicate that 5% of the width of the reference feature is included between an edge of the bounding box and an edge of the document. The image processing device may calculate a size (e.g., a height and/or a width) of the reference feature as depicted in the image (e.g., based on the bounding box). For example, the size may be in a quantity of pixels. The image processing device may calculate one or more distances between the bounds of the reference feature (e.g., between edges of the bounding box) and the one or more edges of the document based on multiplying the one or more percentage values by the size of the reference feature (e.g., by the size of the bounding box).

As another example, the one or more location parameters may indicate a pattern between the location of the reference feature and the border of the document. For example, the pattern may indicate a distance between an edge of the reference feature and an edge of the document. The image processing device may project one or more edges of the bounding box based on the pattern and a size and an orientation of the image to detect one or more edges of the document that define the border or the outline of the document.

In some implementations, the image processing device may calculate a size of the image. The image processing device may determine the perspective distortion associated with the image. The image processing device may calculate, based on the size of the document, the perspective distortion, and the defined location, size, and orientation, one or more distances between the bounding box and respective edges of the document. For example, the image processing device may calculate a first distance from a top of the bounding box to a top edge of the document, a second distance from a bottom of the bounding box to a bottom edge of the document, a third distance from a right side of the bounding box to a right edge of the document, and/or a fourth distance from a left side of the bounding box to a left edge of the document, among other examples. The top edge, the bottom edge, the right edge, and the left edge may define the outline or the border of the document (e.g., as depicted in FIG. 1C).

In some implementations, the image processing device may trigger the image of the document to be stored based on detecting the outline of the document. For example, the image processing device may trigger the user device to capture and/or store the image of the document based on detecting the outline of the document, as described in more detail elsewhere herein. For example, the image processing device may cause the user device to automatically capture and/or store the image of the document (e.g., without additional user input) based on detecting the outline of the document. This may conserve processing resources, computing resources, and/or memory resources that would have otherwise been used to store images for which the image processing device would be unable to detect the border or outline of documents depicted in the images.

As shown by reference number 135, the image processing device may modify the image of the document based on the border of the document to obtain a cropped image. For example, the image processing device may crop the image of the document based on the detected outline or border. For example, cropping may include the removal of unwanted outer areas from an image. In some implementations, the image processing device may remove areas outside of the detected border of the document to obtain the cropped image. As another example, the image processing device may remove areas that are a certain distance outside of the detected border of the document to obtain the cropped image (e.g., the cropped image may have bounds that are slightly larger than the detected border to account for errors in the border detection). In some implementations, the image processing device may store the cropped image of the document.

Figure 1D:
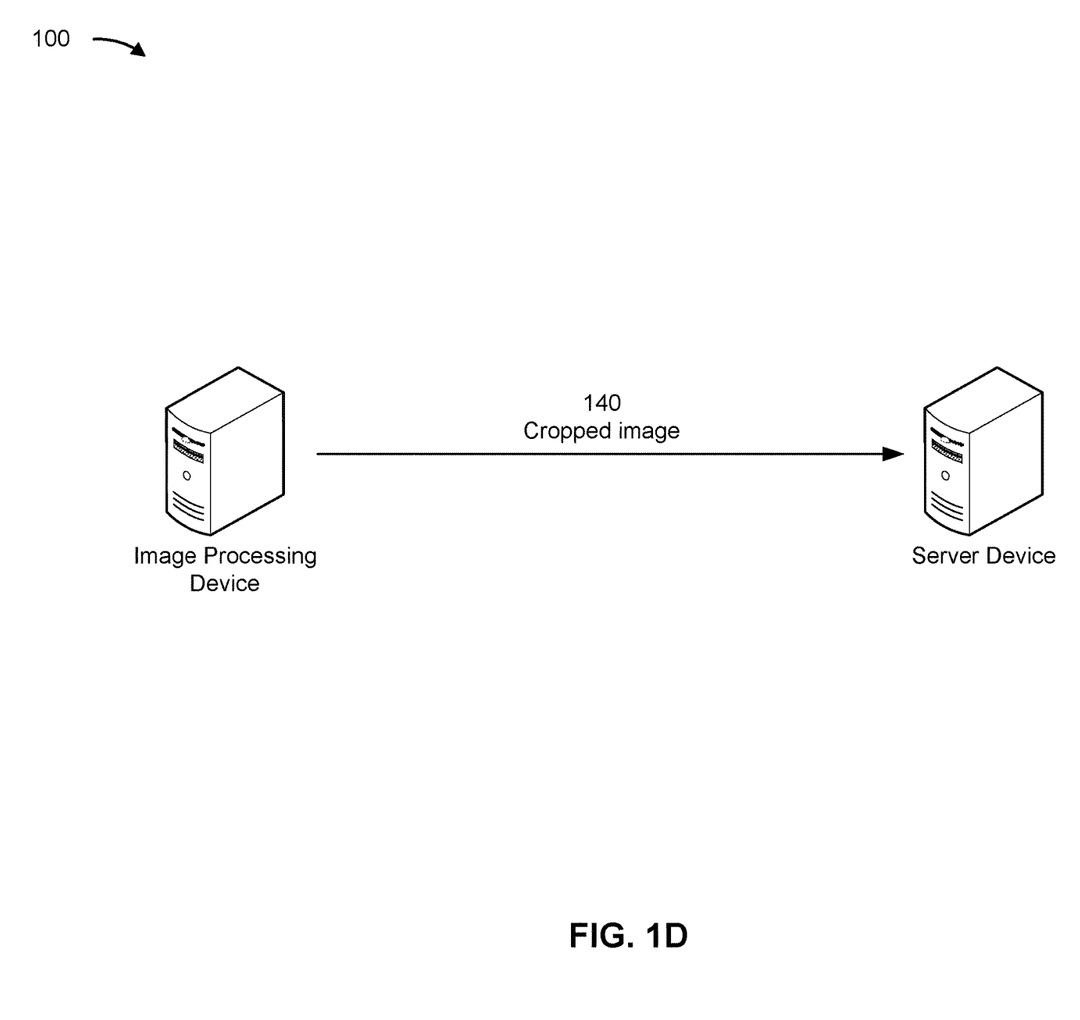

In some implementations, as shown in FIG. 1D, the image processing device may transmit, and the server device may receive, an indication of the cropped image. For example, the image processing device may provide, to the server device, the indication of the cropped image for further processing and/or authentication, among other examples, of the document.

As a result, the image processing device may be enabled to detect the borders or edges of a document using the detected reference feature depicted in an image of the document. This enables the image processing device to perform document detection without relying on contour-based edge detection associated with images of the document. Therefore, the image processing device is enabled to detect an outline or border of a document depicted in an image where the document is a page in a book or booklet and/or where the background of the image is a similar color or image intensity as the document, among other examples. This may conserve processing resources, computing resources, network resources, and/or memory resources, among other examples, that would have otherwise been used associated with obtaining additional images of the document of document detection, attempting to crop the image of the document using inaccurate edge detections, and/or transmitting an image of the document that is not properly cropped and/or detected, among other examples. Further, this may conserve processing resources, computing resources, network resources, and/or memory resources, among other examples, that would have otherwise been used by the server device to analyze and/or process the image of the document that is not cropped. Moreover, this may ensure that additional information (e.g., outside of the document) is not provided to the server device, thereby improving a security associated with a user (e.g., because potentially sensitive information may be included in the image of the document that is not included in the document itself).

As indicated above, FIGS. 1A-1D are provided as an example. Other examples may differ from what is described with regard to FIGS. 1A-1D.

Figure 2:
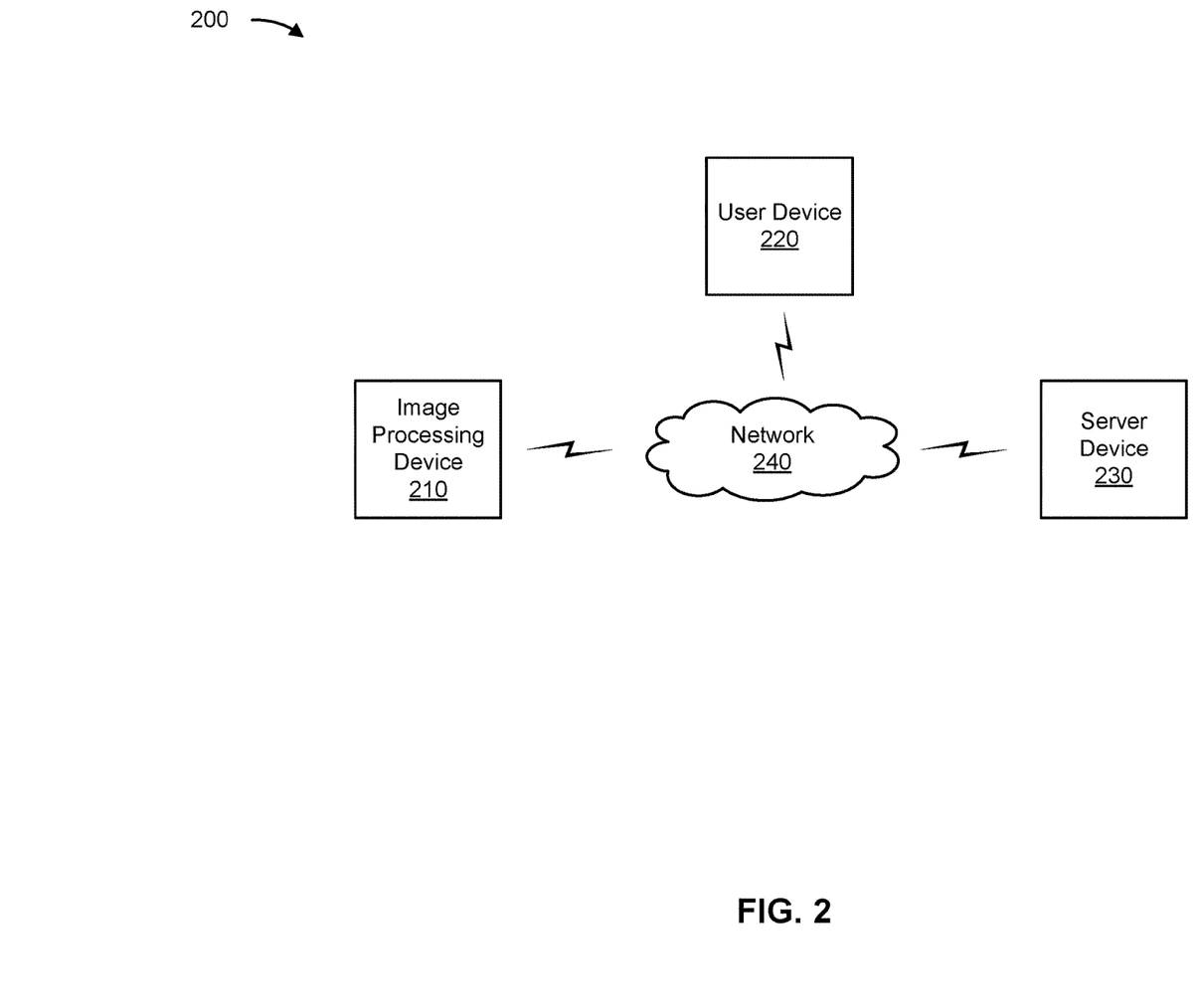
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include an image processing device 210, a user device 220, a server device 230, and a network 240. Devices of environment 200 may interconnect via wired connections, wireless connections, or a combination of wired and wireless connections.

The image processing device 210 may include one or more devices capable of receiving, generating, storing, processing, providing, and/or routing information associated with automatic image cropping using a reference feature, as described elsewhere herein. The image processing device 210 may include a communication device and/or a computing device. For example, the image processing device 210 may include a server, such as an application server, a client server, a web server, a database server, a host server, a proxy server, a virtual server (e.g., executing on computing hardware), or a server in a cloud computing system. In some implementations, the image processing device 210 may include computing hardware used in a cloud computing environment. In some implementations, the image processing device 210 may be associated with, or included in, the user device 220. For example, the image processing device 210 may be a component of the user device 220. In other examples, the image processing device 210 may be separate from (e.g., a separate device from) the user device 220.

The user device 220 may include one or more devices capable of receiving, generating, storing, processing, and/or providing information associated with automatic image cropping using a reference feature, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a wearable communication device (e.g., a smart wristwatch, a pair of smart eyeglasses, a head mounted display, or a virtual reality headset), or a similar type of device.

The server device 230 may include one or more devices capable of receiving, generating, storing, processing, providing, and/or routing information associated with automatic image cropping using a reference feature, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
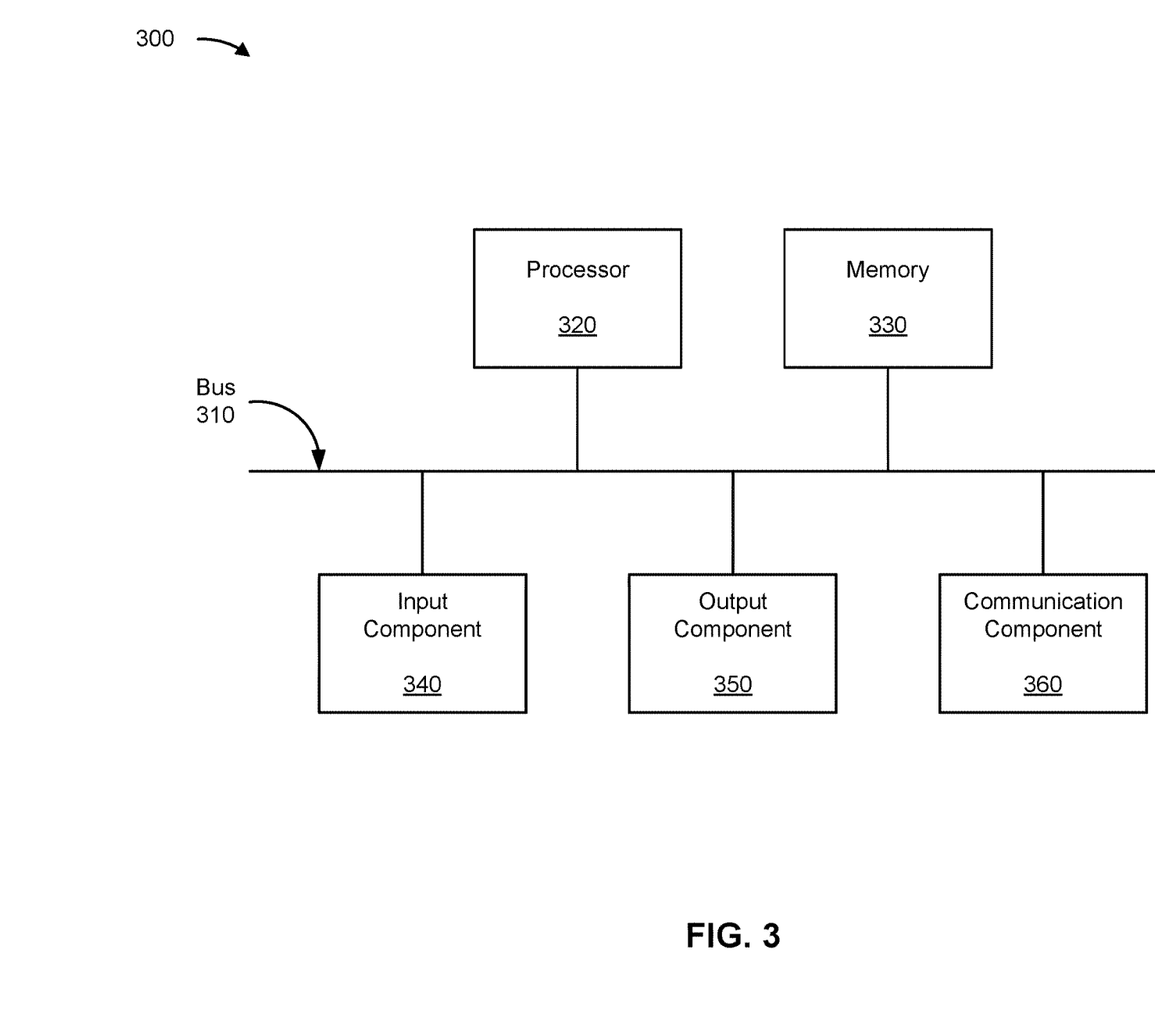
FIG. 3 is a diagram of example components of a device associated with automatic image cropping using a reference feature, in accordance with some embodiments of the present disclosure.

FIG. 3 is a diagram of example components of a device 300 associated with automatic image cropping using a reference feature. The device 300 may correspond to the image processing device 210, the user device 220, and/or the server device 230. In some implementations, the image processing device 210, the user device 220, and/or the server device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
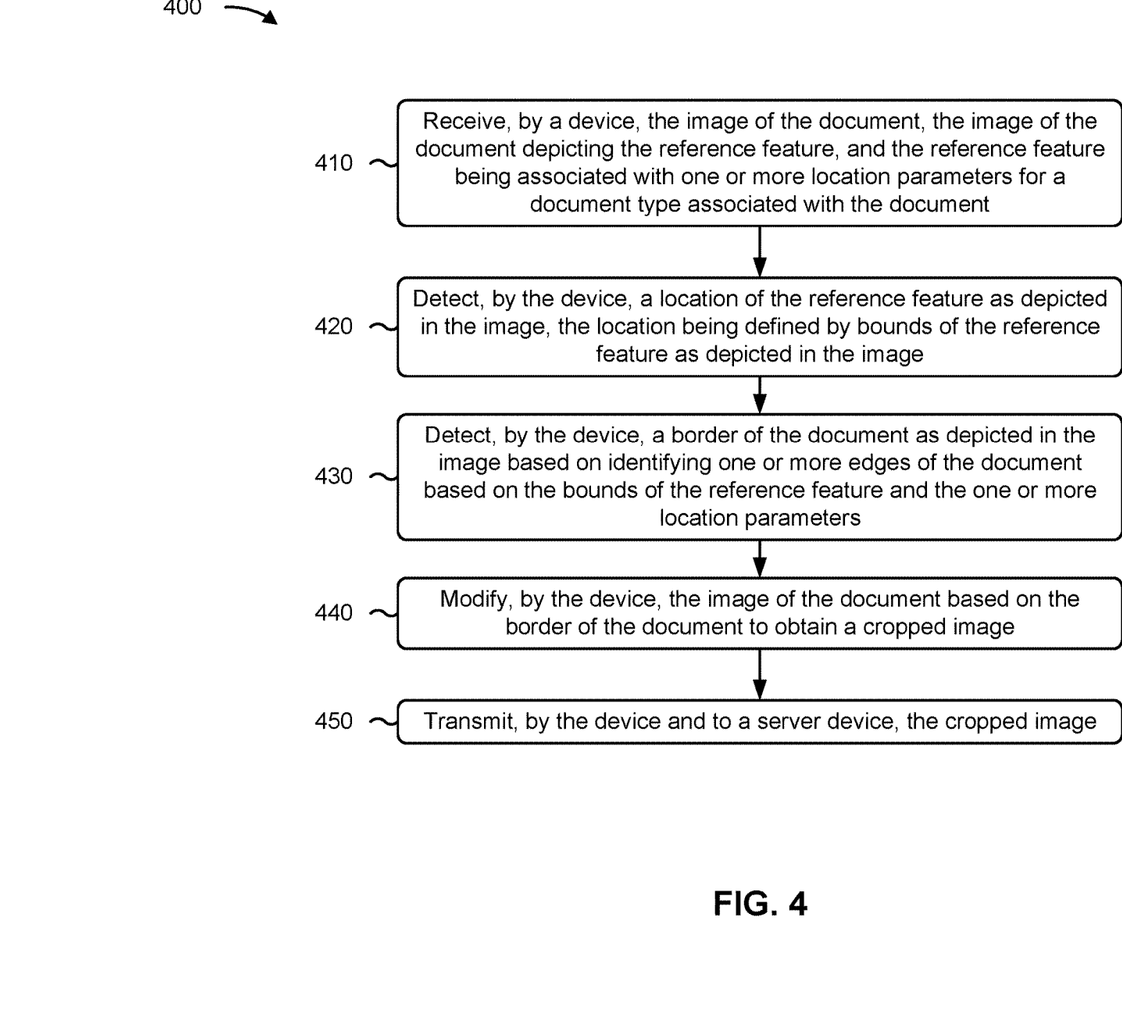
FIG. 4 is a flowchart of an example process associated with automatic image cropping using a reference feature, in accordance with some embodiments of the present disclosure.

FIG. 4 is a flowchart of an example process 400 associated with automatic image cropping using a reference feature. In some implementations, one or more process blocks of FIG. 4 may be performed by the image processing device 210. In some implementations, one or more process blocks of FIG. 4 may be performed by another device or a group of devices separate from or including the image processing device 210, such as the user device 220, and/or the server device 230, among other examples. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving the image of the document, the image of the document depicting the reference feature, and the reference feature being associated with one or more location parameters for a document type associated with the document (block 410). For example, the image processing device 210 (e.g., using processor 320, memory 330, input component 340, and/or communication component 360) may receive the image of the document, the image of the document depicting the reference feature, and the reference feature being associated with one or more location parameters for a document type associated with the document, as described above in connection with reference number 110 of FIG. 1A. As an example, the document type may be a page of a passport (e.g., an identification page) and the reference feature may be a machine-readable zone of the passport.

As further shown in FIG. 4, process 400 may include detecting a location of the reference feature as depicted in the image, the location being defined by bounds of the reference feature as depicted in the image (block 420). For example, the image processing device 210 (e.g., using processor 320 and/or memory 330) may detect a location of the reference feature as depicted in the image, the location being defined by bounds of the reference feature as depicted in the image, as described above in connection with reference numbers 115, 120, and/or 125 of FIG. 1B. As an example, the image processing device 210 may use an OCR model (e.g., an object detection model) to detect a location of the machine-readable zone as depicted in the image of the passport. The image processing device 210 may insert a bounding box around the detected location of the machine-readable zone (e.g., where the bounding box defines the bounds of the reference feature).

As further shown in FIG. 4, process 400 may include detecting a border of the document as depicted in the image based on identifying one or more edges of the document based on the bounds of the reference feature and the one or more location parameters (block 430). For example, the image processing device 210 (e.g., using processor 320 and/or memory 330) may detect a border of the document as depicted in the image based on identifying one or more edges of the document based on the bounds of the reference feature and the one or more location parameters, as described above in connection with reference number 130 of FIG. 1C. As an example, the image processing device 210 may calculate one or more distances between edges of the bounding box and respective edges of the page of the passport as depicted in the image (e.g., based on the one or more location parameters associated with the reference feature). The edges of the page may define the border of the page of the passport, as depicted in the image.

As further shown in FIG. 4, process 400 may include modifying the image of the document based on the border of the document to obtain a cropped image (block 440). For example, the image processing device 210 (e.g., using processor 320 and/or memory 330) may modify the image of the document based on the border of the document to obtain a cropped image, as described above in connection with reference number 135 of FIG. 1C. As an example, the image processing device 210 may remove areas of the image that are outside of the detected border of the page passport. For example, the image processing device 210 may remove another page of the passport (e.g., that is next to the identification page) from the image.

As further shown in FIG. 4, process 400 may include transmitting, to a server device, the cropped image (block 450). For example, the image processing device 210 (e.g., using processor 320, memory 330, and/or communication component 360) may transmit, to a server device, the cropped image, as described above in connection with reference number 140 of FIG. 1D. As an example, the image processing device 210 may provide the cropped image to facilitate an authentication of the passport by the server device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for automatic image cropping using a reference feature, the system comprising:
   one or more memories; and
   one or more processors, communicatively coupled to the one or more memories, configured to:
      obtain an image of a document, the image of the document depicting the reference feature, and the reference feature being associated with a defined location, size, and orientation for a document type associated with the document;
      obtain, via an output of an object detection model, an indication of a location of the reference feature as depicted in the image, the indication of the location including a bounding box;
      detect that the reference feature as depicted in the image is obfuscated based on comparing the bounding box to the defined location, size, and orientation;
      perform, based on detecting that the reference feature as depicted in the image is obfuscated, an action to modify the bounding box;
      detect an outline of the document as depicted in the image based on identifying one or more edges of the document by expanding the bounding box, as modified, based on the defined location, size, and orientation of the reference feature;
      crop the image of the document based on the outline of the document to obtain a cropped image; and
      provide, to a server device, the cropped image.

2. The system of claim 1, wherein the one or more processors are further configured to:
   process the image of the document to modify an orientation or a rotation of the image of the document to obtain an oriented image; and
   provide the oriented image as an input to the object detection model, wherein the output of the object detection model is based on the oriented image.

3. The system of claim 1, wherein the reference feature is a first reference feature and the location is a first location, and wherein the one or more processors are further configured to:
   detect a second location of a second reference feature depicted in the image of the document;
   compare the second location to the first location; and determine whether the first location is correctly detected based on comparing the second location to the first location.

4. The system of claim 3, wherein the one or more processors, to modify the bounding box, are further configured to:
modify the bounding box based on determining that the first location is not correctly detected, wherein the bounding box is modified based on the first location and a correlation between the first location and the defined location.

5. The system of claim 1, wherein the one or more processors, to detect the outline of the document as depicted in the image, are configured to:
calculate a size of the document as depicted in the image;
determine a perspective distortion associated with the image; and
calculate, based on the size of the document, the perspective distortion, and the defined location, size, and orientation, at least one of:
a first distance from a top of the bounding box to a top edge of the document,
a second distance from a bottom of the bounding box to a bottom edge of the document,
a third distance from a right side of the bounding box to a right edge of the document, or
a fourth distance from a left side of the bounding box to a left edge of the document,
wherein the outline of the document is based on the top edge, the bottom edge, the right edge, or the left edge.

6. The system of claim 1, wherein the one or more processors are further configured to:
trigger the image of the document to be stored based on detecting the outline of the document.

7. The system of claim 1, wherein the reference feature includes at least one of:
a machine-readable zone,
a text field,
a user image, or
a barcode.

8. A method of automatically cropping an image of a document using a reference feature, comprising:
receiving, by a device, the image of the document, the image of the document depicting the reference feature, and the reference feature being associated with one or more location parameters for a document type associated with the document;
detecting, by the device, a location of the reference feature as depicted in the image, the location being defined by bounds of the reference feature as depicted in the image;
detecting that the reference feature as depicted in the image is obfuscated based on comparing the bounds of the reference feature to the one or more location parameters;
performing, based on detecting that the reference feature as depicted in the image is obfuscated, an action to modify the bounds of the reference feature;
detecting, by the device, a border of the document as depicted in the image based on identifying one or more edges of the document based on the bounds of the reference feature, as modified, and the one or more location parameters;
modifying, by the device, the image of the document based on the border of the document to obtain a cropped image; and
transmitting, by the device and to a server device, the cropped image.

9. The method of claim 8, wherein the one or more location parameters indicate one or more percentage values indicating distances between one or more edges of the reference feature and the one or more edges of the document, and wherein detecting the border of the document comprises:
calculating a size of the reference feature as depicted in the image; and
calculating one or more distances between the bounds of the reference feature and the one or more edges of the document based on multiplying the one or more percentage values by the size of the reference feature.

10. The method of claim 8, wherein detecting the location of the reference feature as depicted in the image comprises:
analyzing, using optical character recognition (OCR), the image to detect the bounds of the reference feature, the bounds of the reference feature being defined by a bounding box.

11. The method of claim 10, wherein the one or more location parameters indicate a pattern between the location of the reference feature and the border of the document, and wherein detecting the border of the document as depicted in the image comprises:
projecting one or more edges of the bounding box based on the pattern and a size and an orientation of the image to detect one or more edges of the document that define the border.

12. The method of claim 8, wherein detecting the border of the document as depicted in the image comprises:
detecting a perspective orientation associated with the image; and
modifying the bounds of the reference feature as depicted in the image based on the perspective orientation.

13. The method of claim 8, wherein detecting the location of the reference feature comprises:
modifying the image to a top-down view of the image;
detecting the location of the reference feature using the top-down view of the image; and
inserting a bounding box defining the bounds of the reference feature, as detected using the top-down view, into the image of the document.

14. The method of claim 8, further comprising:
performing perspective correction for the image based on the bounds of the reference feature as detected in the image.

15. A non-transitory computer-readable medium storing a set of instructions, the set of instructions comprising:
one or more instructions that, when executed by one or more processors of a device, cause the device to:
obtain an image of a document, the image of the document depicting a reference feature, and the reference feature being associated with one or more location parameters for a document type associated with the document;
obtain, via an output of an object detection model, an indication of a location of the reference feature as depicted in the image, the indication of the location including a bounding box;
detect that the reference feature as depicted in the image is obfuscated based on comparing the bounding box to one or more parameters associated with the image;
perform, based on detecting that the reference feature as depicted in the image is obfuscated, an action to modify the bounding box;

detect a border of the document as depicted in the image based on identifying one or more edges of the document by expanding the bounding box based on the one or more location parameters;

crop the image of the document based on the border of the document to obtain a cropped image; and provide, to a server device, the cropped image.

16. The non-transitory computer-readable medium of claim 15, wherein the reference feature is a first reference feature and the location is a first location, and wherein the one or more processors are further configured to:

detect a second location of a second reference feature depicted in the image of the document;

compare the second location to the first location; and determine whether the first location is correctly detected based on comparing the second location to the first location.

17. The non-transitory computer-readable medium of claim 15, wherein the one or more instructions, that cause the device to detect the border of the document as depicted in the image, cause the device to:

calculate, based on the one or more location parameters, at least one of:

a first distance from a top of the bounding box to a top edge of the document, a second distance from a bottom of the bounding box to a bottom edge of the document, a third distance from a right side of the bounding box to a right edge of the document, or a fourth distance from a left side of the bounding box to a left edge of the document, wherein the border of the document is based on the top edge, the bottom edge, the right edge, or the left edge.

18. The non-transitory computer-readable medium of claim 15, wherein the reference feature includes a machine-readable zone.

19. The non-transitory computer-readable medium of claim 15, wherein the one or more parameters associated with the image include another location of another refence feature included in the image.

20. The non-transitory computer-readable medium of claim 15, wherein the one or more parameters associated with the image include a defined location, size, and orientation, associated with the reference feature, for a document type associated with the document.

\* \* \* \* \*